United States Patent [19]

Ivie

[11] Patent Number: 4,850,535

[45] Date of Patent: Jul. 25, 1989

[54] VARIABLY CONVERGENT EXHAUST NOZZLE FOR A MODEL DUCTED FAN UNIT

[76] Inventor: Paul B. Ivie, 8447 Sanger Ave., Whittier, Calif. 90606

[21] Appl. No.: 168,851

[22] Filed: Mar. 16, 1988

[51] Int. Cl.$^4$ .............................................. F02K 1/30
[52] U.S. Cl. ............................ 239/265.39; 239/265.43; 239/602
[58] Field of Search ....................... 239/265.37, 265.39, 239/265.43, 546, 602; 60/235

[56] References Cited

U.S. PATENT DOCUMENTS

| 2,603,062 | 7/1952 | Weiler et al. | 239/265.43 |
| 2,608,053 | 8/1952 | Davidson | 239/546 |
| 2,634,578 | 4/1953 | Kallal | 239/546 |
| 2,693,078 | 11/1954 | Laucher | 239/546 |
| 2,927,424 | 3/1960 | Hyde | 239/265.39 |
| 3,231,197 | 1/1966 | Strom | 239/265.39 |
| 3,460,763 | 8/1969 | Kopp | 239/265.43 |

Primary Examiner—Andres Kashnikow
Assistant Examiner—Michael J. Forman
Attorney, Agent, or Firm—W. Edward Johansen

[57] ABSTRACT

The present invention is a variably convergent exhaust nozzle includes a ring, pluralities of first inner leaves, second inner leaves, lever-arms and hinges and a cable for use with a ducted fan unit and a driving mechanism. The ring has a peripheral edge. Each of the first and second inner leaves is formed out of a semiflexible material and has a first and end and a second end. The first and second inner leaves are distributed along the peripheral edge of the ring. The first leaves are fixedly coupled to the ring at their first ends. The second inner leaves overlap the first inner leaves. The first end of each second inner leaf is fixedly coupled to adjacent first ends of the first inner leaves. Each lever-arm contacts one of the first inner leaves. The hinge pivotally couples each lever-arm to the peripheral edge of the ring so that each lever-arm may pivot adjacent to the first end of one of the first inner leaves in order for its second end to press against the second end of one of the first inner leaves. The cable is threaded through each lever-arm adjacent to its second end. The driving mechanism provides tension to the cable thereby pulling the lever-arms and the first inner leaves together at their respective second ends so that the variably convergent exhaust nozzle is slightly convergent in order to maximize thrust and substantially more convergent to maximize top speed.

1 Claim, 3 Drawing Sheets

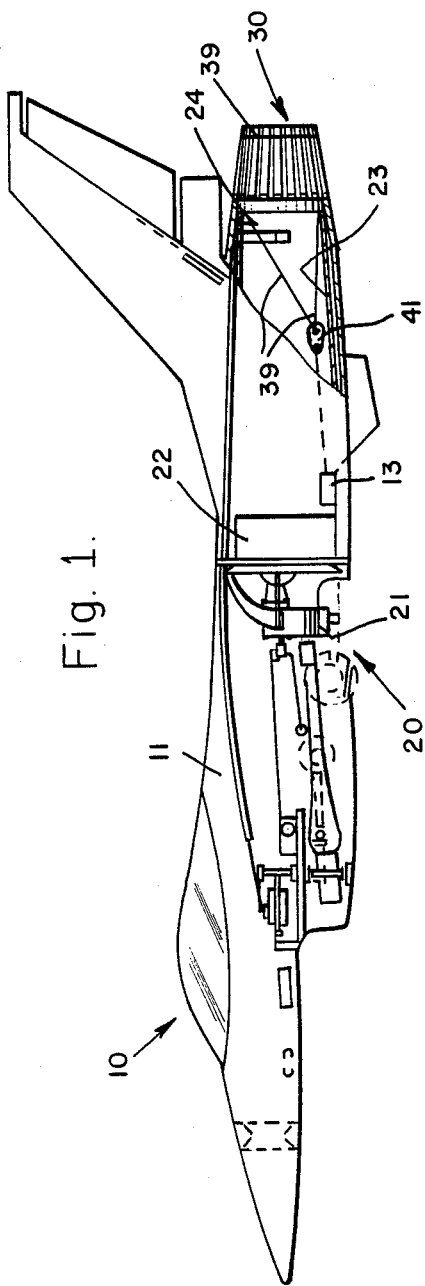
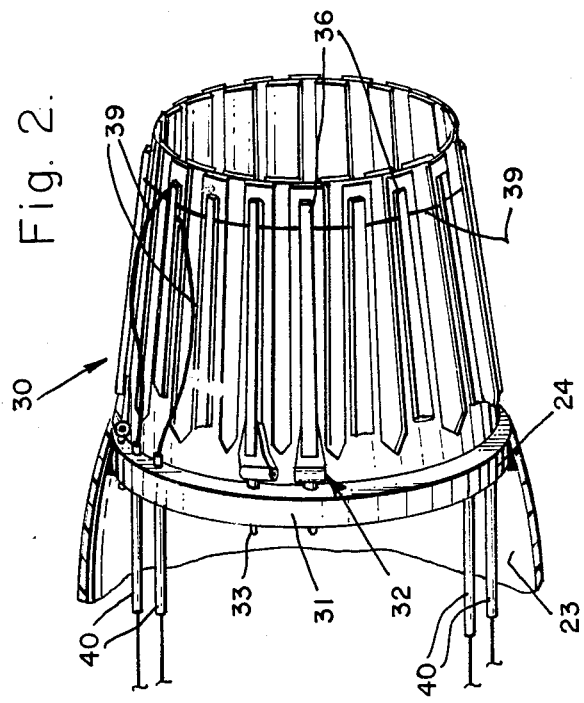
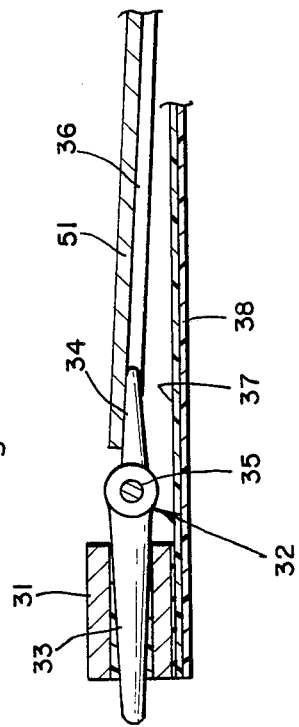

VARIABLY CONVERGENT EXHAUST NOZZLE FOR A MODEL DUCTED FAN UNIT

BACKGROUND OF THE INVENTION

1. Field of the Inventions

The present invention relates to an exhaust nozzle for a ducted fan unit for a model aircraft which includes a fan, a motor and an exhaust duct with an end opening and more particularly to a variably convergent exhaust nozzle which provides not only maximum thrust, but which also may be adjusted for providing maximum speed.

2. Description of the Prior Art

U.S. Pat. No. 4,685,289, entitled Power Plant for Model Jet Aircraft, issued to Lee W. Anderson and Robert S. Violett on Aug. 11, 1987, teaches a ducted fan unit for use in a power plant of a model vehicle, such as either a model aircraft or a model boat. The ducted fan unit includes a motor which is a one cylinder internal combustion engine, an exhaust duct with an end opening, a fan and a mounting for the motor. The one cylinder internal combustion engine utilizes a special vertically oriented carburetor. The exhaust duct is supported by a set of stators each of which has an aerodynamic shape for straightening airflow through the exhaust duct. The fan has seven identical individual replaceable blades. The fan is disposed at the front of the exhaust duct and is directly driven by the motor. One stator is essentially encloses the vertical carburetor and smoothly directs the airflow from the fan around the carburetor to the one cylinder of the motor for cooling. The stator has an opening to the carburetor air inlet for providing air under pressure thereto. The stator is shaped to cooperate with the exhaust duct and aft fairings of the power plant in order to deliver a smooth airstream which has a uniform non-turbulent flow in order to produce a maximum propulsive efficiency.

U.S. Pat. No. 4,307,857, entitled Ducted Fan Unit, issued to Byron L. Godbersen on Dec. 29, 1981, teaches a ducted fan unit which is installed in a scale model airplane. The ducted fan unit is positioned centrally within the hollowed fuselage and includes an engine and a fan which is assembled thereto. The ducted fan unit is secured to a mounting bracket which is aerodynamically sleek. The mounting bracket is secured to a cowl and positions the fan within the forward portion of the cowl. The rearward portion of the cowl includes a flow straightener which has radially disposed spokes with curved forward portions to deflect the air flow linearly.

U.S. Pat. No. 4,250,658, entitled Ducted Fan for Model Aircraft, issued to Robert W. Kress on Feb. 17, 1981, teaches a ducted fan unit for a model aircraft which is powered by a piston engine. The piston engine is mounted in a hollow portion of an inner core body and drives a multibladed fan. Two sets of stationary vanes are attached to the core body. A cylindrical shroud, which is fitted over the assembly, is attached to the outer ends of the vanes.

U.S. Pat. No. 3,434,679, entitled Simulated Reaction Engine Model, issued to John R. Erwin and John T. Kutney on Mar. 25, 1969, teaches a model ducted fan unit which simulates the in-flight aerodynamic characteristics of a ducted fan unit which is powered by a turbojet engine. The model ducted fan unit has an external configuration which is similar to the engine simulated and includes a fan and a turbine engine. The fan is disposed within an annular casing and the turbine engine drives the fan. The external configuration of the model ducted fan unit is sized in predetermined reduced lineal scale to the engine simulated and the fan and turbine engine are sized to develop a pressure ratio across the fan substantially similar to the pressure ratio across the simulated turbine engine fan and a mass flow rate reduced in relation to the mass flow rate of the simulated engine by substantially the square of the predetermined reduced lineal scale.

U.S. Pat. No. 3,612,400 entitled Variable Jet Propulsion Nozzle, issued to Douglas Johnson and Henry M. Mar on Oct. 12, 1971, teaches an exhaust duct and variably convergent-divergent propulsion nozzle for a supersonic turbofan engine. The nozzle includes a ring of leaves providing a convergent nozzle portion and a second ring of leaves downstream of the first defining a divergent nozzle portion. The downstream end of the divergent nozzle portion is connected to a ring of leaves defining a fairing around the nozzle. The fairing and divergent leaves are free to float radially at their downstream ends. The converging nozzle leaves and the forward end of the diverging nozzle leaves are actuated by a common linkage so as to coordinate the movement of the two and permit the floating movement of the downstream end of the nozzle. The structure, including the exhaust duct wall, is characterized by lightweight construction and arrangements for cooling the structure exposed to hot gas. Outward movement of the fairing leaves is limited by a ring of swinging links which includes a stop which limits their extending motion to a degree short of straightening the joints.

U.S. Pat. No. 4,603,568, entitled Method of Fabricating Bimetal Variable Exhaust Nozzle Flaps and Seals, issued to Melvin R. Jackson, Stephen F. Rutkowski and Paul A. Siemers on May 30, 1985, teaches a method of forming a generally planar part for a jet engine. The part can withstand high thermal stress but not high mechanical stress. A preformed strip of a superalloy is mounted around a drum shaped mandrel. A low pressure plasma deposit of a different superalloy is formed on the preformed strip. The strip is demounted and mechanically straightened.

U.S. Pat. No. 4,638,946, entitled Variable Configuration Exhaust Discharge Opening for a Jet Propulsion Engine, issued to John M. Hall on Jan. 27, 1987, teaches a gas turbine jet propulsion engine which has a rectangular exhaust gas outlet. A pair of u-shaped tracks one on each side of the outlet and which extend downstream of it, support rollers carrying the plates. Of a pair of articulated deflectors one above and one below the outlet. The deflectors are translatable along the tracks between the final exhaust discharge opening of the engine. The configurations include a convergent divergent nozzle, a thrust vectoring nozzle and thrust reversing outlets.

U.S. Pat. No. D-241,360, entitled Toy Jet Engine, issued to James J. Scozzafava on Sept. 7, 1976, teaches a design for a ducted fan unit for a model jet aircraft.

U.S. Pat. No. 4,573,937, entitled Jet Propelled Model Airplane, issued to Victor Stanzel on Mar. 4, 1986, teaches a line-controlled, centrifugal fan, jet-propelled model airplane in which the impeller of a fan is contained within the fuselage of the aircraft. The impeller of the fan is driven from a remote drive unit by an elongated flexible cable which is contained within a flexible sheath. The impeller rotates about an axis perpendicular to the longitudinal axis of the aircraft and is driven in a direction of rotation tending to rotate the aircraft about its lateral axis in a noseup direction, due to the frictional contact of the compressed air between the rotating impeller and the housing of the centrifugal fan mounted within the fuselage. A flywheel which is powered by the electric motor in the remote drive unit controls the rate of acceleration and deceleration of the aircraft as an electric motor in the drive unit is switched on and off.

U.S. Pat. No. 4,369,149, entitled Carburetor for Model Jet Power Plant; Having Circular Duct and Multibladed Fan, issued to Robert S. Violett on Jan. 18, 1983, teaches a vertically oriented carburetor for use in a model jet aircraft power plant which includes a circular duct and a multibladed fan. The carburetor utilizes an essentially cylindrical body which has a web portion to permit air flow from the fan for cooling the cylinder of a model engine and a forwardly oriented carburetor air opening for receiving pressurized air from the fan. Concentric fuel feed and throttle tubes have their adjustments for control at the top end so as to be external to the power plant circular duct to eliminate interference with the propulsion air stream from the fan.

SUMMARY OF THE INVENTION

In view of the foregoing factors and conditions characteristic of the prior art it is the primary object of the present invention to provide a variably convergent exhaust nozzle for a ducted fan unit for a model aircraft which provides not only maximum thrust, but which also may be adjusted for providing maximum speed.

It is another object of the present invention to provide to a variably convergent exhaust nozzle for a ducted fan unit for a model aircraft which not only looks like a variably convergent-divergent propulsion nozzle of a ducted fan unit of a jet aircraft, but also operates like it.

In accordance with an embodiment of the present invention a variably convergent exhaust nozzle for use with a ducted fan unit and a driving mechanism is described. The variably convergent exhaust nozzle includes a ring, pluralities of first inner leaves, second inner leaves, lever-arms and hinges and a cable. The ring has a peripheral edge. Each of the first and second inner leaves is formed out of a semi-flexible material and has a first end and a second end. The first and second inner leaves are distributed along the peripheral edge of the ring. The first leaves are fixedly coupled to the ring at their first ends. The second inner leaves overlap the first inner leaves. The first end of each second inner leaf is fixedly coupled to adjacent first ends of the first inner leaves. Each lever-arm contacts one of the first inner leaves. The hinge pivotally couples each lever-arm to the peripheral edge of the ring so that each lever-arm may pivot adjacent to the first end of one of the first inner leaves in order for its second end to press against the second end of one of the first inner leaves. The cable is threaded through each lever-arm adjacent to its second end. The driving mechanism provides tension to the cable thereby pulling the lever-arms and the first inner leaves together at their respective second ends so that the variably convergent exhaust nozzle is slightly convergent in order to maximize thrust and substantially convergent to maximize top speed.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a side elevational view in cross-section of a model jet aircraft having a ducted fan unit which includes a motor, a fan, an exhaust duct with an end opening and a variably convergent exhaust nozzle which has been constructed in accordance with the principles of the first embodiment of the present invention.

FIG. 2 is a perspective drawing of the variably convergent exhaust nozzle of FIG. 1.

FIG. 3 is a partial side elevational view in cross-section of the variably convergent exhaust nozzle of FIG. 1 showing a ring, a hinge which is mounted in the ring, a lever-arm which is mechanically coupled to the hinge.

DESCRIPTION OF THE PREFERRED EMBODIMENT

Figure 4:
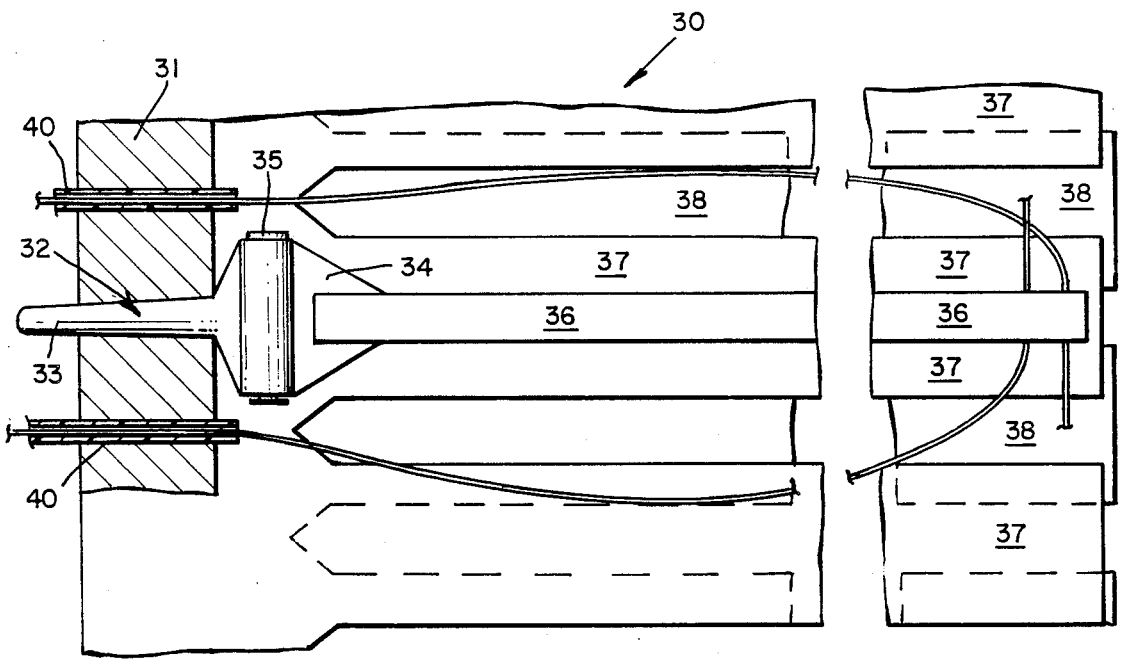
FIG. 4 is a partial top plan view of the variably convergent exhaust nozzle of FIG. 1.

In order to best understand the present invention it is necessary to refer to the following description of its preferred embodiment conjunction with the accompanying drawing. Referring to FIG. 1 a scale model jet aircraft 10 has a hallow fuselage 11 in which a servo motor 13 is disposed. A ducted fan unit 20 is positioned centrally within the hollow fuselage 11 and includes a motor which is an engine 21 and a fan which is disposed within a shroud 22. The ducted fan unit 20 also includes an exhaust duct 23 with an end opening 24.

U.S. Pat. No. 4,307,857 and U.S. Pat. No. 4,250,658 teach a ducted fan engine for a model jet aircraft which is powered by a either piston gas engine or an electric motor. Each of which is mounted in a hollow portion of an inner core body and drives a multibladed fan. Any other type of model vehicle may be used including either a model boat or a model car. Any other type of driving mechanism may used in place of the servo motor 13. Any other type of motor may be used in place of the engine 21.

Referring to FIG. 1 in conjunction with FIG. 2 and FIG. 3 a variably convergent exhaust nozzle 30 for use in the scale model jet aircraft 10. The variably convergent exhaust nozzle 30 includes a ring 31 and a plurality of hinges 32. The ring 31 has a peripheral edge and is fixedly coupled to the exhaust duct 23 at the end opening 24. Each hinge 32 has a mounting arm 33, a pivot arm 34 and a pivot pin 35. The variably convergent exhaust nozzle 30 also includes pluralities of lever-arms 36, first inner leaves 37 and second inner leaves 38. Each of the first and second inner leaves 37 and 38 is formed out of a semi-flexible material and has a first end and a second end. The pivot arm 34 of each hinge 32 and the lever arm 36 may be one integral member.

In another embodiment there may be a plurality of outer leaves 51 each of which is formed out of a semi-flexible material and has a first end and a second end. Each outer leaf 51 is fixedly coupled to one of the lever arms 36. Each of the first and second inner leaves 37 and 38 and the outer leaves 51 is thin and has a rectangularly fingerlike shape.

Referring to FIG. 2 in conjunction with FIG. 3 and FIG. 4 the variably convergent exhaust nozzle 30 further includes a cable 39, a cable-bearing 40 which is slidably coupled to the cable 39 and a pulley 41 which is slidably coupled to the cable 39 and fixedly coupled to the servo motor 13. The first inner leaves 37 are distributed along the peripheral edge of the ring 31 and are fixedly coupled to the ring 31 at their first ends. The second inner leaves 38 are distributed along the peripheral edge of the ring 31 so that the second inner leaves 38 overlap the first inner leaves 37. The first end of each second inner leaf 38 is fixedly coupled to adjacent first ends of the first inner leaves 37. Each lever-arm 36 contacts one of the first inner leaves 37. The hinge 32 pivotally couples each lever-arm 36 to the peripheral edge of the ring 31 so that each lever-arm 36 may pivot adjacent to the first end of one of the first inner leaves 37 in order for its second end to press against the second end of one of the first inner leaves 37. The cable 39 is threaded through each lever-arm 37 adjacent to its second end.

Figure 5:
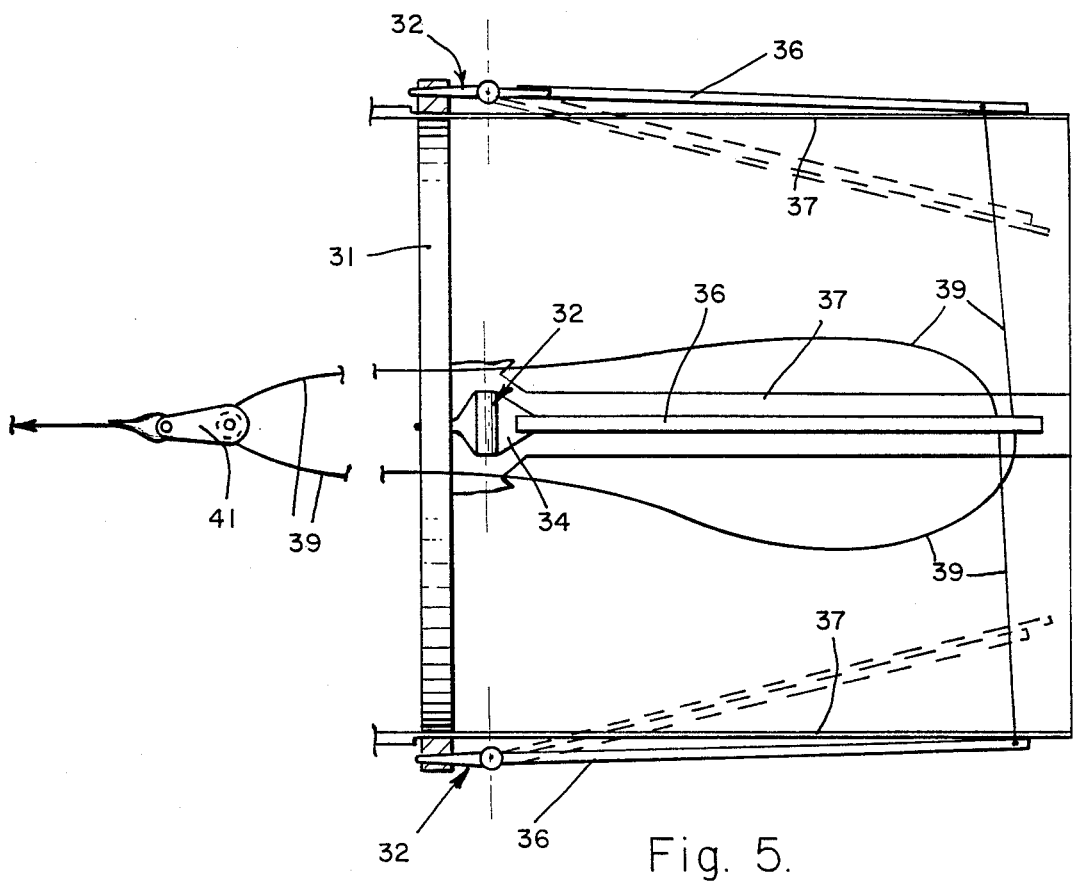
FIG. 5 is a top elevational view of the variably convergent exhaust nozzle of FIG. 1.
Figure 6:
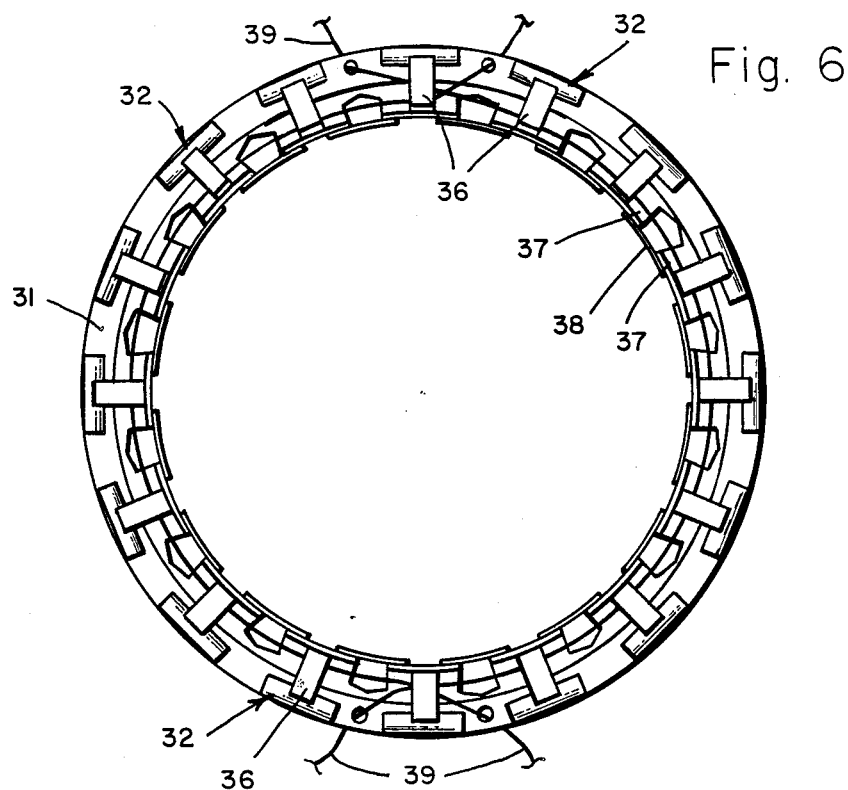
FIG. 6 is a rear end view of the model jet aircraft of FIG. 1 in which the variably convergent exhaust nozzle is substantially convergent.

Referring to FIG. 2 in conjunction with FIG. 5 and FIG. 6 when the lever-arms 36 and the first inner leaves 37 are separated and have not been pulled closer together at their respective second ends, the convergency of the variably convergent exhaust nozzle 30 is adjusted to provide maximum thrust.

Figure 7:
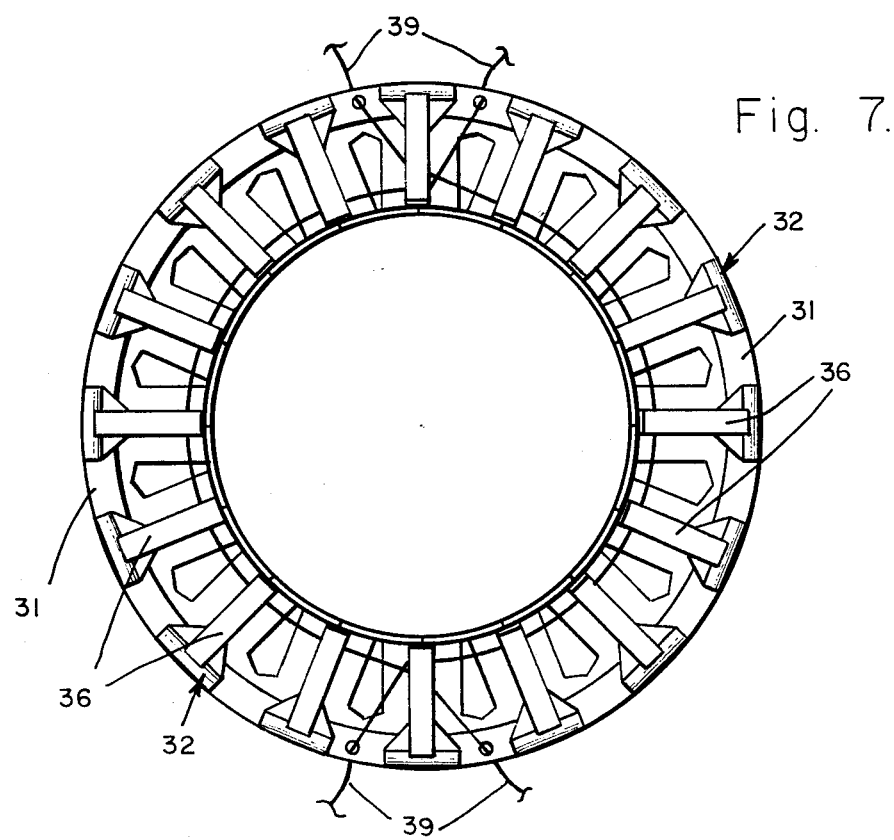
FIG. 7 is a rear end view of the model jet aircraft of FIG. 1 in which the variably convergent exhaust nozzle is substantially convergent.

Referring to FIG. 2 in conjunction with FIG. 5 and FIG. 7 when the servo motor 13 provide tension to the cable 39 through the pulley 41 the cable 39 pulls the lever-arms 36 and the first inner leaves 37 together at their respective second ends and the convergency of the variably convergent exhaust nozzle 30 is adjustably increased in order to provide maximum speed.

From the foregoing it can be seen that a variably convergent exhaust nozzle for use in a model jet aircraft having a ducted fan unit has been described. It should be noted that the sketches are not drawn to scale and that distance of and between the figures are not to be considered significant.

Accordingly it is intended that the foregoing disclosure and showing made in the drawing shall be considered only as an illustration of the principle of the present invention.

What is claimed is:

1. A variably convergent exhaust nozzle for use in a model vehicle having a chamber, a first driving mechanism which is disposed in the hollow chamber, a ducted fan unit which includes a fan and a second driving mechanism which drives the fan, said variably convergent exhaust nozzle comprising:
   a. a ring which is disposed near the end of the chamber and which has a peripheral edge;
   b. a plurality of first inner leaves each of which is formed out of a semi-flexible material and has a first end and a second end, said first inner leaves being distributed along said peripheral edge of said ring and being fixedly coupled to said ring at said first end;
   c. a plurality of second inner leaves each of which is formed out of a semi-flexible material and has a first end and a second end, said second inner leaves being distributed along said peripheral edge of said ring so that said second inner leaves overlap said first inner leaves, said first end of each of said second inner leaves being fixedly coupled to said first ends of two adjacent said first inner leaves;
   d. a plurality of lever-arms each of which contacts one of said first inner leaves;
   e. hinging means for hinging each of said lever-arms to said ring so that each of said lever-arm may pivot at said peripheral edge of said ring adjacent to said first end of one of said first inner leaves in order for its said second end to press against said second end of one of said first inner leaves; and
   f. a cable which is threaded through each of said lever-arms adjacent to its said second end whereby the first driving mechanism provides tension to said cable thereby pulling said lever-arms and said first inner leaves together at their respective ends so that said first and second inner leaves variably converge together at their respective said second ends whereby the first driving mechanism is mechanically coupled to said converging means for driving said variably convergent exhaust nozzle which becomes less convergent to provide more thrust and more convergent to provide more speed.

* * * * *